(12) United States Patent  (10) Patent No.: US 6,422,469 B1
Pernet  (45) Date of Patent: Jul. 23, 2002

(54) CHIP CARD READER

(75) Inventor: Michel Pernet, Doubs (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/707,893

(22) Filed: Nov. 7, 2000

(30) Foreign Application Priority Data

Nov. 8, 1999 (FR) ............................................. 99 14002

(51) Int. Cl.⁷ ................................................. G06K 7/00
(52) U.S. Cl. ........................ 235/486; 235/492; 235/441; 235/483; 235/487; 361/727; 361/740
(58) Field of Search ................................ 235/486, 492, 235/439, 441, 483, 487; 361/737, 736, 740, 727, 728, 730; 43/630, 945

(56) References Cited

U.S. PATENT DOCUMENTS

| | | | | |
|---|---|---|---|---|
| 3,878,371 A | * | 4/1975 | Burke .................... | 235/92 PD |
| 5,055,970 A | | 10/1991 | Weihs ........................ | 361/399 |
| 5,563,400 A | | 10/1996 | Le Roux .................... | 235/486 |
| 5,625,534 A | * | 4/1997 | Okaya et al. ............... | 361/737 |
| 5,894,597 A | * | 4/1999 | Schwartz et al. ........... | 235/441 |
| 5,918,163 A | * | 6/1999 | Rossi .......................... | 455/90 |
| 5,933,328 A | | 8/1999 | Wallace et al. ............. | 361/737 |
| 6,006,987 A | * | 12/1999 | Hoolhorst ................... | 235/441 |
| 6,053,775 A | * | 4/2000 | Ungermann et al. ........ | 235/441 |
| 6,134,114 A | * | 10/2000 | Ungermann et al. ........ | 361/737 |
| 6,164,989 A | * | 12/2000 | Glad et al. .................. | 439/945 |
| 6,173,405 B1 | * | 1/2001 | Nagel ......................... | 235/486 |
| 6,179,649 B1 | * | 1/2001 | An .............................. | 439/500 |
| 6,213,403 B1 | * | 4/2001 | Bates, III ................... | 235/492 |
| 6,259,409 B1 | * | 7/2001 | Fulton et al. ................ | 455/90 |

FOREIGN PATENT DOCUMENTS

| | | |
|---|---|---|
| DE | 3916783 A1 | 4/1990 |
| DE | 19703007 A1 | 7/1998 |
| EP | 0549983 A1 | 7/1993 |
| EP | 0810541 A2 | 12/1997 |
| FR | 2628901 | 9/1989 |
| FR | 2 743 170 | 7/1997 |
| GB | 2317260 | * 3/1998 |

* cited by examiner

Primary Examiner—Michael G. Lee
Assistant Examiner—Uyen-Chau Le
(74) Attorney, Agent, or Firm—Perman & Green, LLP

(57) ABSTRACT

A chip card reader which includes a housing consisting of a base (4) and a cover (12). An insulating frame (6) is provided, which supports electric contacts connected, on the one hand, to a printed board (9) on which electronic data processing components are mounted and, on the other hand, to a universal USB socket, snapped at the end of the housing. The reader is characterized in that it includes a linearly moving slide unit (14) which is designed to transport the chip card (2) from the outside into the housing to connect the conductive segments of the card (2) to the electric contacts of the socket (10).

9 Claims, 4 Drawing Sheets

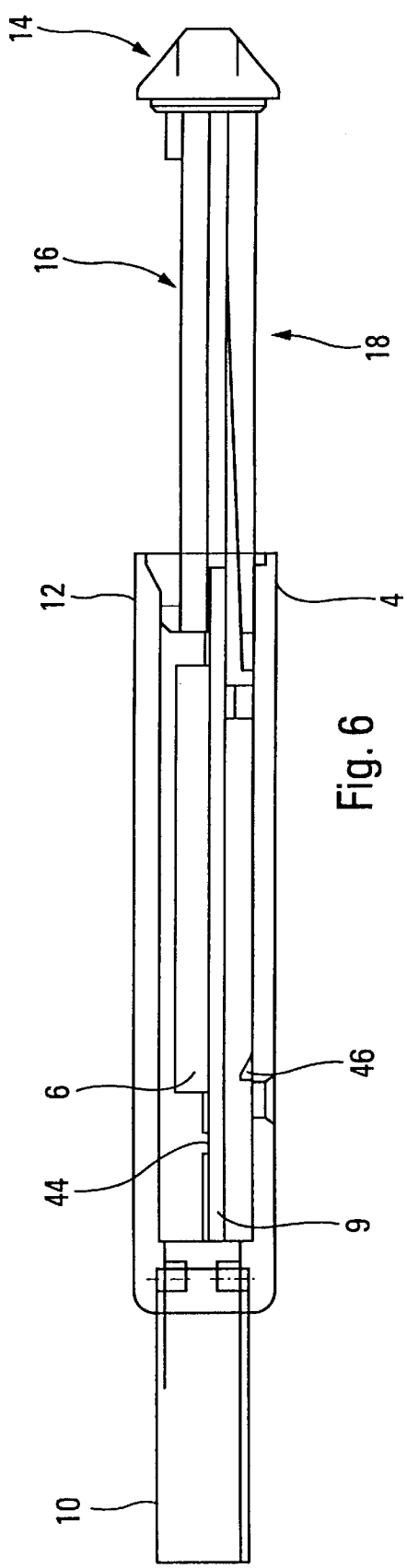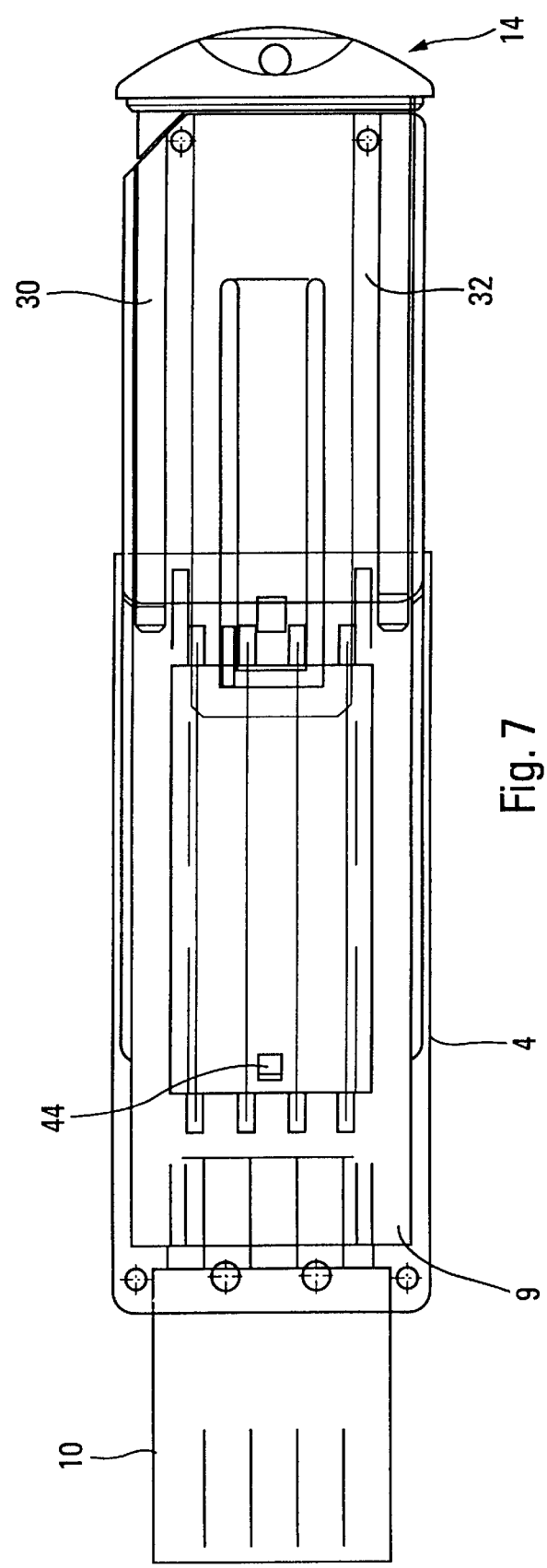

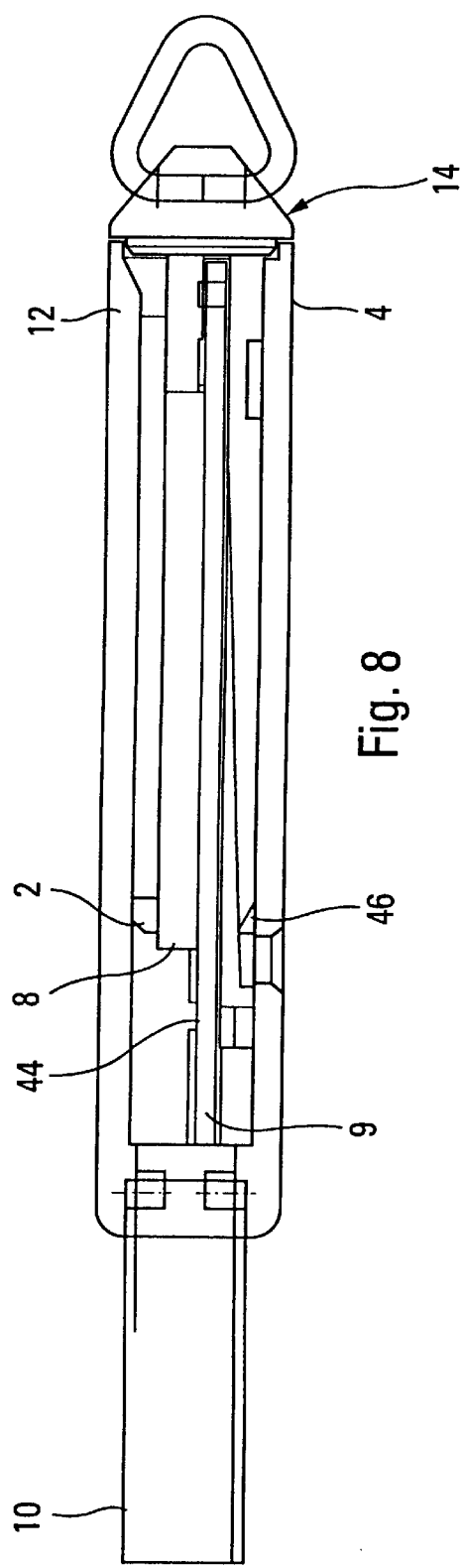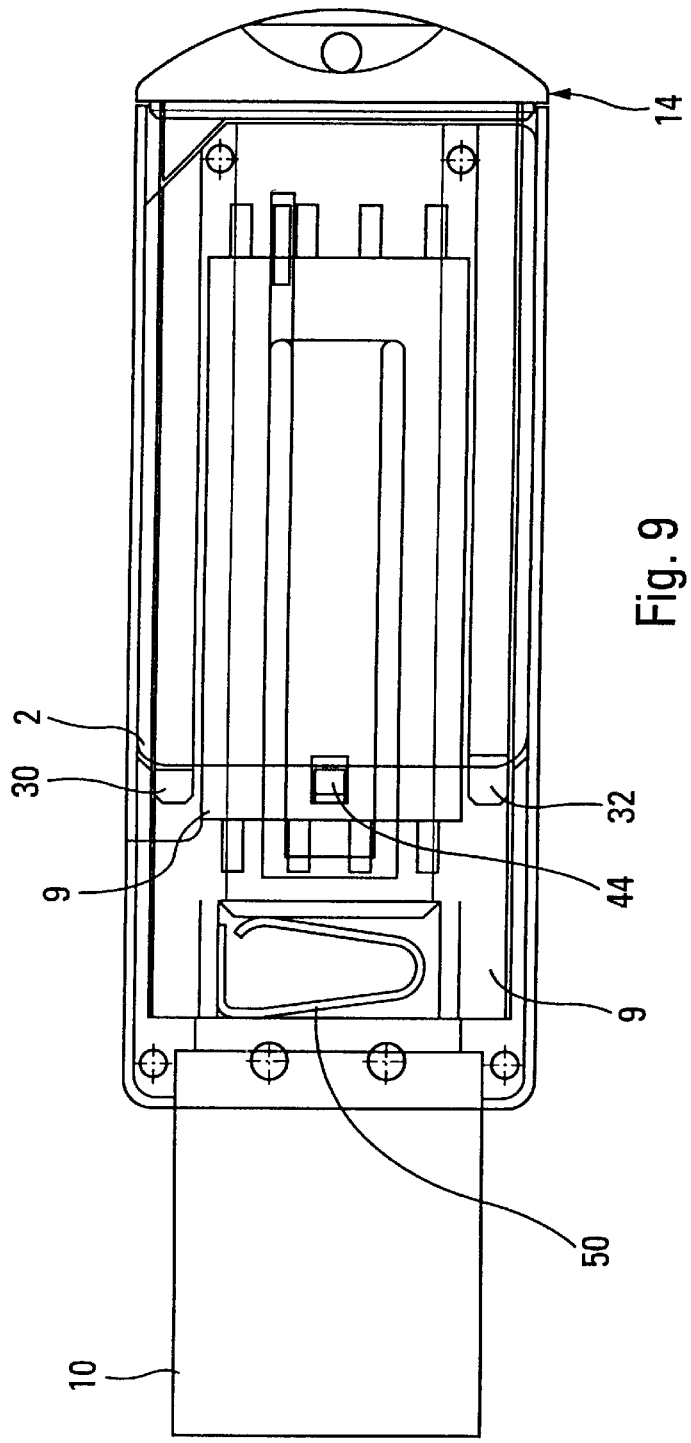

CHIP CARD READER

BACKGROUND OF THE DISCLOSURE

1. Field of the Invention

The present invention relates to a chip card reader which comprises a housing, formed by a base and a cover, wherein an insulating frame is provided, which supports electric contacts connected, on the one hand, to a "substrate" on which electronic data processing components are mounted and, on the other hand, to a universal socket, which is snapped at the end of said housing and connected to a dialog-dedicated port and ensures interfacing with a processing and communication system.

The invention also relates to a mobile telephone having such a chip card reader.

2. Description of Prior Developments

The chip card readers designed to fit into computer systems for processing commercial transactions (ATMS, ticket machines, etc.), in public phones or in mobile phones generally have card slides operating with the so-called landing technology. This technology, described in patent FR 88 03 500 consists in transporting the card above the printed board accommodated inside the housing and positioning it, by letting it land on the electric contacts of a fixed connector on the printed board. A drawback of this type of reader derives from the clutter formed in the housing, which complicates its fabrication. Furthermore, these readers are not self-contained, because they are generally dedicated to specific applications.

BRIEF SUMMARY OF THE INVENTION

The object of the present invention is to provide a chip card reader being of simple conception and self-contained, forming little clutter and being able to be connected to several different data processing systems.

The chip card reader according to the invention is characterized in that it comprises a linearly moving slide unit which is designed to transport the chip card from the outside into the housing to connect the conductive segments of the chip card to the electric contacts of a universal socket, for instance of the USB type.

Thanks to the invention, the size of the chip card reader is reduced and its fabrication is considerably simplified.

According to a preferred embodiment of the invention, the slide unit comprises an upper platform, mounted to be movable above the printed board, and having a shape and size adapted to support the chip card, and a lower platform, mounted to be movable beneath said printed board and provided with means for locking/unlocking said slide unit inside the housing.

Thanks to this structure, the printed board helps to guide the slide unit inside the housing. Moreover, the means for locking the slide unit allow to stabilize the slide unit in the housing with the highest accuracy. In accordance with an advantageous embodiment of the invention, the base of the housing has at least two parallel slide rails, which are shifted longitudinally to provide, on the one hand, a support for the printed board and, on the other hand, a guiding means for the lower platform in the housing.

Preferably, said upper platform consists of two coplanar arms being arranged to slide above the printed board when the slide unit moves, and said lower platform consists of three parallel arms, being connected at their proximal ends and at their distal ends, and arranged to slide beneath said printed board, between said slide rails.

Hence, it is easy to accurately control the motion of the slide unit in the housing and, as a result, the position of the card on the printed board.

BRIEF DESCRIPTION OF SEVERAL VIEWS OF THE DRAWINGS

Additional features and advantages of the invention will be further discussed in the following description with reference to the accompanying figures provided as nonlimiting examples:

FIG. 6 is a schematic plane and side view of the card reader as shown in FIG. 1 in the open position;

FIG. 7 is a schematic plane and top view of the card reader as shown in FIG. 1 in the open position;

FIG. 8 is a schematic plane and side view of the card reader as shown in FIG. 1 in the closed position;

FIG. 9 is a schematic plane and top view of the card reader as shown in FIG. 1 in the closed position.

DETAILED DESCRIPTION OF PREFERRED EMBODIMENTS OF THE INVENTION

Figure 1:
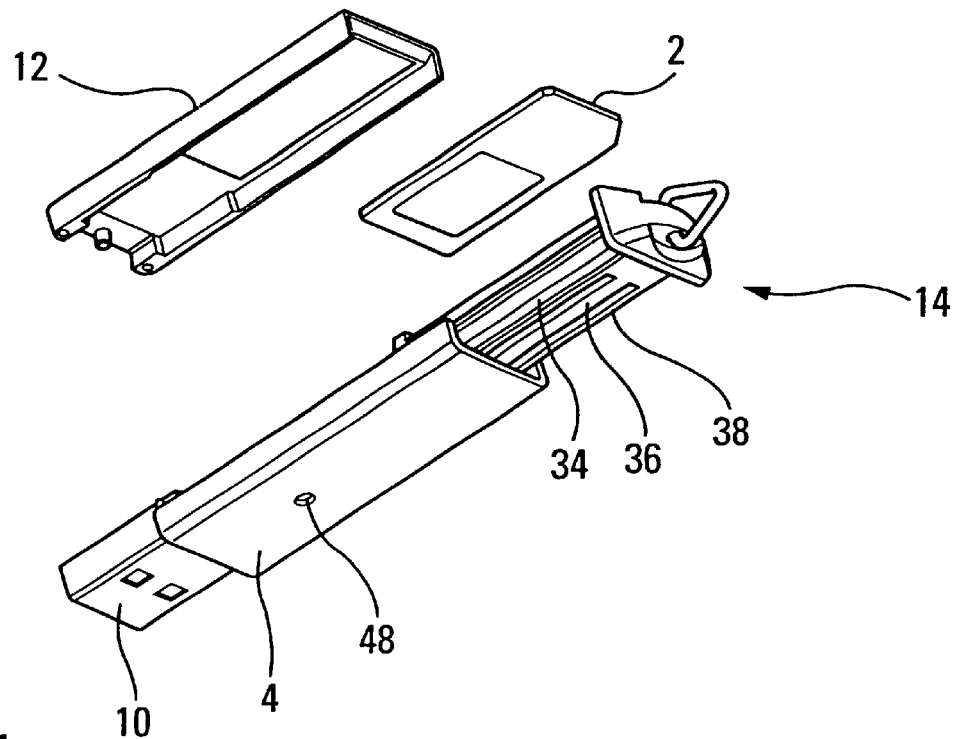
FIGS. 1 and 2 are elevational views of a chip card reader complying with the invention.
Figure 2:
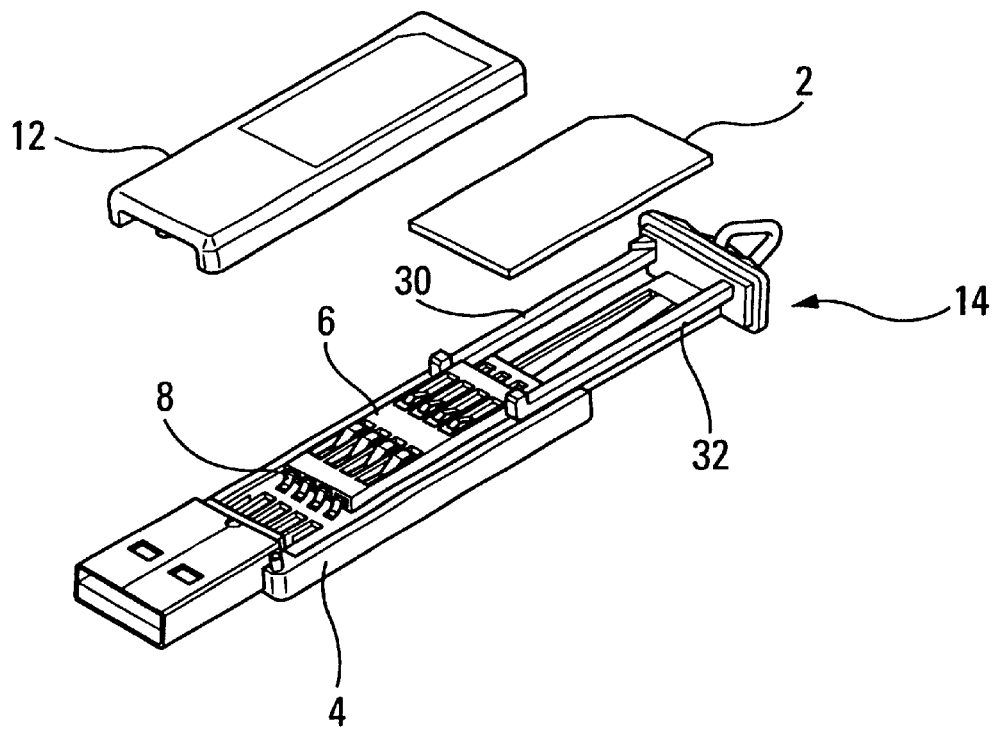
Figure 3:
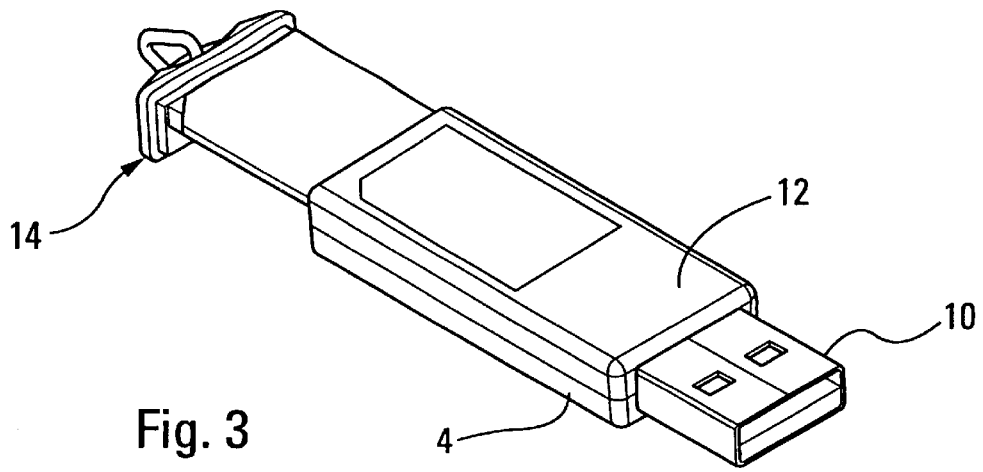
FIG. 3 is a perspective top view of the lower part of the reader as shown in FIG. 1.

Referring to FIGS. 1 to 3, a chip card reader comprises a housing consisting of a base 4 wherein an insulating frame 6 is provided (FIG. 2), which supports electric contacts 8 connected, on the one hand, to a printed board 9 (FIG. 6) on which electronic data processing components are mounted and, on the other hand, to a universal USB (Universal Serial Bus) socket 10, snapped at the end of said housing. A cover 12 having a shape and size adapted to those of the base 4 is provided to form, with said base 4, a space for surrounding the set of elements which form the card reader. The cover 12 may have a transparent upper face, as may be seen in FIG. 3, and may be snap-fitted onto the base 4. It may as well be molded with said base 4 from the same material. A linearly moving slide unit 14 is provided to transport the chip card 2 from the outside into the housing to connect the conductive segments thereof with the electric contacts of the USB socket 10.

Figure 4:
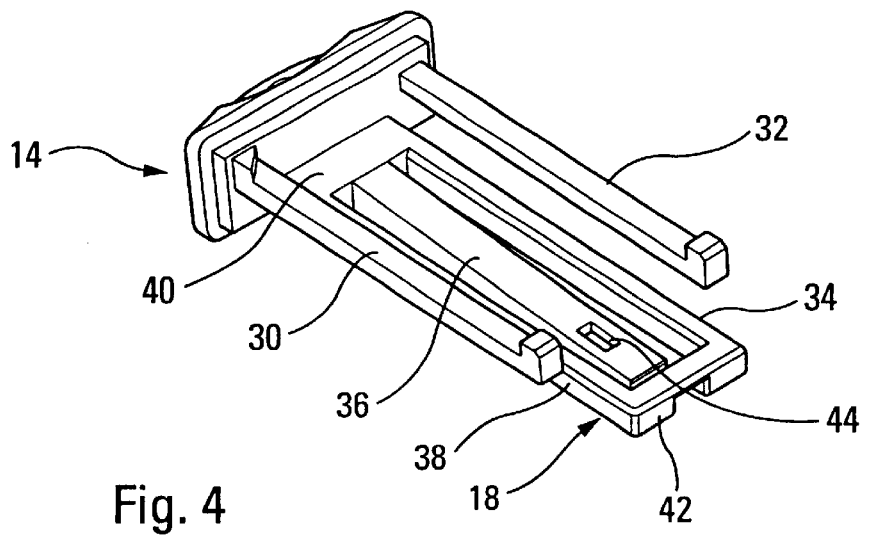
FIG. 4 is a perspective view of a slide unit fitted in the card reader as shown in FIG. 1.

According to a preferred embodiment of the invention, shown in FIG. 4, the slide unit 14 comprises an upper platform 16, shown in dotted lines in FIG. 4 mounted to be movable above the printed board 9, having a shape and size adapted to support the chip card 2, and a lower platform 18, mounted to be movable beneath said printed board 9 and provided with means for locking/unlocking said slide unit 14 inside the housing.

Said upper platform 16 consists of two coplanar arms 30 and 32 being arranged to slide above the printed board when the slide unit 14 moves, whereas the lower platform 18 consists of three parallel arms 34, 36, 38, being connected at their proximal ends 40 and at their distal ends 42, and arranged to slide beneath said printed board, between said slide rails 22 when the slide unit moves. Also, the distal end 42 of the central arm 36 has a notch 44 designed to receive a lug 46 provided on the base 4 of the housing. Said base has a hole 48, as shown in FIG. 1, which gives access to the lower platform 18 to unlock the central arm 36 of the base 4 by exerting an upward pressure thereon.

In order to assist this unlocking operation, said central arm 36 is shaped with a descending slope between its proximal end 40 and its distal end 42. A spring 50, as shown in FIG. 9, is provided at the bottom of the base 4 of the housing to push the slide unit 14 outwards when the central arm 36 is unlocked.

Figure 5:
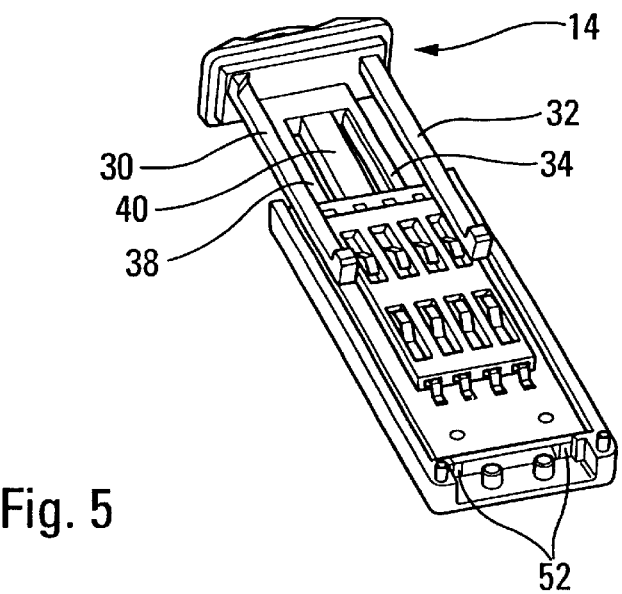
FIG. 5 is a perspective view of a slide unit mounted in the housing of the card reader as shown in FIG. 1.

As may be seen in FIG. 5, the base 4 of the housing has two parallel slide rails 52, which are shifted longitudinally to provide, on the one hand, a support for the printed board and, on the other hand, a guiding means for the lower platform 18 in the housing.

In order to communicate with a data processing system, the card reader according to the invention includes a microprocessor and a memory (not shown), for management and storage of exchanged data respectively. These circuits may be directly carried by and positioned under the insulating frame 6 as described in patent FR 95 15 666.

The card reader according to the invention may be used as a security key to a computer, or as a user authentication means. It may as well provide control of accesses to computer system requiring codes. Finally, the reader of the invention may be fitted in a portable telephone.

What is claimed is:

1. A chip card reader which comprises a housing, consisting of a base and a cover, and in which an insulating frame is provided, which supports electric contacts connected, on one hand, to a printed board on which electronic data processing components are mounted and, on another hand, to a universal socket, which is snapped at an end of the housing and connected to a dialog-dedicated port and ensures interfacing with a processing and communication system, the chip reader further includes a linearly moving slide unit which is designed to transport a chip card from outside into the housing to connect conductive segments of the card to electric contacts of the socket, the slide unit comprising an upper platform mounted to be movable above the printed board, and having a shape and size adapted to support the chip card and a lower platform mounted to be movable beneath the printed board and provided with means for locking and unlocking the slide unit inside the housing.

2. A reader as claimed in claim 1, wherein said base has at least two parallel slide rails, which are shifted longitudinally to provide, on one hand, a support for said printed board and, on another hand, a guiding means for said lower platform in said housing.

3. A reader as claimed in claim 2, wherein said upper platform consists of two coplanar arms being arranged to slide above said printed board when said slide unit moves, and said lower platform consists of three parallel arms being connected at their proximal ends and at their distal ends and arranged to slid beneath said printed board, between said slide rails.

4. A reader as claimed in claim 3, wherein a distal end of one of the central arms has a notch designed to receive a lug provided on said base.

5. A reader as claimed in claim 4, wherein said central arm is shaped with a descending slope between its proximal end portion and its distal end.

6. A reader as claimed in claim 1, further including a microprocessor and a memory for management and storage, respectively, of data exchanged with a data processing computer system.

7. A reader as claimed in claim 1, wherein said cover has a transparent upper face.

8. A reader as claimed in claim 1, wherein said chip card reader further includes a spring, provided at the bottom of said base, arranged to push said slide unit outwards when a central arm is unlocked.

9. A mobile telephone wherein the mobile telephone includes a reader as claimed in claim 1.

* * * * *